United States Patent
Usaka et al.

(10) Patent No.: US 9,090,747 B2
(45) Date of Patent: Jul. 28, 2015

(54) MOLDED URETHANE FOAM PAD FOR VEHICLE SEATS, VEHICLE SEAT, AND PROCESSES FOR THE PRODUCTION THEREOF

(71) Applicants: Mitsui Chemicals, Inc., Minato-ku, Tokyo (JP); Toyota Jidosha Kabushiki Kaisha, Toyota-shi, Aichi (JP); Toyota Boshoku Kabushiki Kaisha, Kariya-shi, Aichi (JP)

(72) Inventors: Kazuto Usaka, Chiba (JP); Koichi Sano, Ichihara (JP); Hideaki Otsuka, Ichihara (JP); Hiroyuki Utsumi, Bangkok (TH); Takashi Inoh, Okazaki (JP); Yoshiyuki Murata, Okazaki (JP); Tsuguyoshi Sakai, Toyota (JP)

(73) Assignees: MITSUI CHEMICALS, INC., Tokyo (JP); TOYOTA JIDOSHA KABUSHIKI KAISHA, Aishi (JP); TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/284,042

(22) Filed: May 21, 2014

(65) Prior Publication Data

US 2014/0250648 A1 Sep. 11, 2014

Related U.S. Application Data

(62) Division of application No. 13/120,014, filed as application No. PCT/JP2009/066240 on Sep. 17, 2009, now Pat. No. 8,770,666.

(30) Foreign Application Priority Data

Sep. 24, 2008 (JP) ................. 2008-244728

(51) Int. Cl.

| | | |
|---|---|---|
| *C08J 9/00* | (2006.01) | |
| *C08J 9/30* | (2006.01) | |
| *B60N 2/70* | (2006.01) | |
| *C08G 18/40* | (2006.01) | |
| *C08G 18/42* | (2006.01) | |
| *C08G 18/48* | (2006.01) | |
| *C08G 18/63* | (2006.01) | |
| *C08G 18/76* | (2006.01) | |
| *C08G 101/00* | (2006.01) | |

(52) U.S. Cl.
CPC ............ *C08J 9/0061* (2013.01); *B60N 2/7017* (2013.01); *C08G 18/4018* (2013.01); *C08G 18/4072* (2013.01); *C08G 18/4288* (2013.01); *C08G 18/48* (2013.01); *C08G 18/632* (2013.01); *C08G 18/7607* (2013.01); *C08J 9/30* (2013.01); *C08G 2101/0008* (2013.01); *C08G 2101/0058* (2013.01); *C08G 2101/0083* (2013.01); *C08G 2350/00* (2013.01); *C08J 2201/00* (2013.01); *Y10T 29/481* (2015.01)

(58) Field of Classification Search
CPC ........ C08J 9/0061; C08J 9/30; C08J 2201/00; C08J 2321/00; C08L 21/00; B60N 2/7017
See application file for complete search history.

(56) References Cited

U.S. PATENT DOCUMENTS

| | | | |
|---|---|---|---|
| 2,787,601 A | 4/1957 | Detrick et al. | |
| 4,609,682 A | 9/1986 | Weber et al. | |
| 2009/0127915 A1 | 5/2009 | Nozawa et al. | |
| 2010/0069519 A1 | 3/2010 | Mcclarren et al. | |
| 2010/0291369 A1* | 11/2010 | McEvoy et al. | ............ 428/304.4 |
| 2011/0166245 A1* | 7/2011 | Kunihiro et al. | ............... 521/172 |

FOREIGN PATENT DOCUMENTS

| | | |
|---|---|---|
| JP | 62-184706 A | 8/1987 |
| JP | 05-001128 A | 1/1993 |
| JP | 05-059144 A | 3/1993 |
| JP | 2000-325877 A | 11/2000 |

(Continued)

OTHER PUBLICATIONS

International Search Report received in PCT/JP2009/066240; issued Jan. 12, 2010.
Polyurethane Jushi Handbook (Polyurethane Resin Handbook) edited by Keiji Iwata, first printing, The Nikkan Kogyo Shimbun, Ltd. (1987), pp. 71-98.

(Continued)

*Primary Examiner* — Anthony D Barfield
(74) *Attorney, Agent, or Firm* — Foley & Lardner LLP

(57) ABSTRACT

An object of the invention is to provide molded urethane foam pads and vehicle seats that can contribute to the reduction of environmental load and have appropriate impact resilience and hardness and excellent durability with good balance, and also have high comfort. A molded urethane foam pad for vehicle seats including a polyurethane is obtainable by foaming and curing materials including a plant-derived polyol (A), a non-plant-derived polyol (B), water, a catalyst, a foam stabilizer and a polyisocyanate, and has a core density of 55 to 65 kg/m$^3$ as measured in accordance with JIS K6400; the plant-derived polyol (A) is a polyol which is obtained by condensing a polyhydric alcohol of 6 hydroxyl groups with a plant-derived, C15 or higher hydroxycarboxylic acid and which has a hydroxyl value of 45 to 55 mg KOH/g; the non-plant-derived polyol (B) is a polyol having a hydroxyl value of 18 to 26 mg KOH/g, and/or a polymer-dispersed polyol in which fine particles of a polymer of a compound having an unsaturated bond are dispersed in the polyol; and the polyurethane contains a plant-derived molecular structure and the content of the plant-derived molecular structure is 15 to 20 wt % based on 100 wt % of the molded urethane foam pad.

2 Claims, No Drawings

(56) References Cited

FOREIGN PATENT DOCUMENTS

| JP | 2005-320437 A | 11/2005 |
| JP | 2006-104404 A | 4/2006 |
| JP | 2008-056779 A | 3/2008 |
| JP | 2009-084321 A | 4/2009 |
| WO | WO-2007/020904 A1 | 2/2007 |

OTHER PUBLICATIONS

US Notice of Allowance dated Apr. 7, 2014 issued in U.S. Appl. No. 13/120,014.

US Office Action dated Sep. 26, 2013 issued in U.S. Appl. No. 13/120,014.

* cited by examiner

MOLDED URETHANE FOAM PAD FOR VEHICLE SEATS, VEHICLE SEAT, AND PROCESSES FOR THE PRODUCTION THEREOF

CROSS-REFERENCE TO RELATED PATENT APPLICATIONS

This application is a Divisional of U.S. application Ser. No. 13/120,014, filed Mar. 21, 2011 which is a U.S. National Stage of International Application No. PCT/JP2009/066240, filed Sep. 17, 2009 which claims priority to Japanese Application No. 2008-244728, filed Sep. 24, 2008, the disclosures of which are hereby incorporated by reference in their entirety.

TECHNICAL FIELD

The present invention relates to molded urethane foam pads for vehicle seats, vehicle seats having the urethane pads, and processes for producing the pads and the seats.

In detail, the invention relates to molded urethane foam pads for vehicle seats that are produced from plant-derived materials and have excellent impact resilience, hardness and durability with good balance, and to highly comfortable vehicle seats having the urethane pads.

BACKGROUND ART

Flexible polyurethane foams are resin parts having excellent rebound properties and are widely used as seat cushions or the like in vehicles such as automobiles.

Vehicle seat cushions are required to have excellent durability and small changes in cushion elasticity, hardness and thickness after along term of use. The vehicle seats also require appropriate hardness and elasticity to provide comfortable sitting (static comfort) and vibration absorbing properties to reduce vibrations from the road and to achieve comfortable ride (dynamic comfort). These properties of the vehicle seats are closely associated to the fatigue in long drive and significantly affect human safety.

On the other hand, from the viewpoint of the reduction of environmental load, there have been demands for plant-derived resins from plant resources as alternatives for the petroleum-derived resins from petroleum resources. Plants grow by photosynthesis absorbing $CO_2$ in the atmosphere. The plant-derived resins obtained from such plant materials are therefore carbon neutral. In detail, the $CO_2$ emissions by combustion of these resins are not added to the $CO_2$ amount in the air. The plant-derived resins are therefore attractive materials that can contribute to the reduction of environmental load. Further, the prevention of the depletion of limited petroleum resources will increase its importance in the future, and active use of plant resources will be very effective means for that purpose.

Patent Literatures 1 and 2 propose flexible polyurethane foams used in vehicle seat cushions that are produced from plant resources such as starch, molasses, rice bran and castor oil.

However, existing polyurethane foams from plant resources generally do not have appropriate hardness, impact resilience and durability with good balance. In particular, producing foams having high impact resilience is difficult.

Patent Literature 3 then discloses a plant-derived polyurethane foaming composition comprising a combination of a plant-derived polyol and a low-monool polyol, and a polyurethane foam as a vehicle seat cushion material that has appropriate impact resilience, hardness and durability with good balance.

However, the impact resilience of the polyurethane foams according to Patent Literature 3 is as low as about 60%, and cushioning properties and touch are still unsatisfactory. Further improvements are necessary to meet market demands for vehicle seat comfort.

CITATION LIST

Patent Literatures

Patent Literature 1: U.S. Pat. No. 2,787,601
Patent Literature 2: JP-A-H05-59144
Patent Literature 3: WO 2007/020904 A1

SUMMARY OF INVENTION

Technical Problem

The present invention is aimed at solving the problems in the art as described above. It is therefore an object of the invention to provide molded urethane foam pads for vehicle seats that can contribute to the reduction of environmental load and have excellent impact resilience, hardness and durability with good balance, and to provide highly comfortable vehicle seats having the molded urethane foam pads.

Solution to Problem

The present inventors studied diligently to solve the problems described hereinabove. They have then found that a molded urethane foam pad for vehicle seats that comprises a polyurethane and has specific properties and a specific content of plant-derived molecular structures in the polyurethane can contribute to the reduction of environmental load and achieves excellent impact resilience, hardness and durability with good balance. They have further found that a vehicle seat having the molded urethane foam pad provides high comfort. The present invention has been completed based on the findings.

For example, the present invention is specified with the following [1] to [5].

[1] A molded urethane foam pad for vehicle seats comprising a polyurethane, wherein the pad is obtainable by foaming and curing materials comprising a plant-derived polyol (A), a non-plant-derived polyol (B), water, a catalyst, a foam stabilizer and a polyisocyanate, and has a core density of 55 to 65 $kg/m^3$ as measured in accordance with JIS K6400, the plant-derived polyol (A) is a polyol which is obtained by condensing a polyhydric alcohol of 6 hydroxyl groups with a plant-derived, C15 or higher hydroxycarboxylic acid and which has a hydroxyl value of 45 to 55 mg KOH/g, the non-plant-derived polyol (B) is a polyol having a hydroxyl value of 18 to 26 mg KOH/g, and/or a polymer-dispersed polyol in which fine particles of a polymer of a compound having an unsaturated bond are dispersed in the polyol, and the polyurethane contains a plant-derived molecular structure and the content of the plant-derived molecular structure is 15 to 20 wt % based on 100 wt % of the molded urethane foam pad.

[2] A molded urethane foam pad for vehicle seats, wherein the pad is obtainable by foaming and curing materials comprising a plant-derived polyol (A), a non-plant-derived polyol (B), water, a catalyst, a foam stabilizer and a polyisocyanate, and has a core density of 55 to 65 kg/m$^3$ as measured in accordance with JIS K6400, the plant-derived polyol (A) is a polyol which is obtained by condensing a polyhydric alcohol of 6 hydroxyl groups with a plant-derived, C15 or higher hydroxycarboxylic acid and which has a hydroxyl value of 45 to 55 mg KOH/g, the non-plant-derived polyol (B) is a polyol having a hydroxyl value of 18 to 26 mg KOH/g, and/or a polymer-dispersed polyol in which fine particles of a polymer of a compound having an unsaturated bond are dispersed in the polyol, and the content of a plant-derived component contained in the plant-derived polyol (A) is 14 to 19 wt % based on 100 wt % of the materials.

[3] A vehicle seat comprising the molded urethane foam pad and a seat upholstery.

[4] A process for manufacturing molded urethane foam pads for vehicle seats, wherein molded urethane foam pads having a core density of 55 to 65 kg/m$^3$ as measured in accordance with JIS K6400 are produced from materials comprising a plant-derived polyol (A), a non-plant-derived polyol (B), water, a catalyst, a foam stabilizer and a polyisocyanate, and further wherein:

the process comprises a step of:

preparing a resin premix comprising the non-plant-derived polyol (B), water, the catalyst and the foam stabilizer, thereafter mixing the resin premix with the plant-derived polyol (A) and the polyisocyanate, injecting the mixture into a mold, reacting, foaming and curing the mixture, and releasing the product from the mold, the plant-derived polyol (A) is a polyol which is obtained by condensing a polyhydric alcohol of 6 hydroxyl groups with a plant-derived, C15 or higher hydroxycarboxylic acid and which has a hydroxyl value of 45 to 55 mg KOH/g, the non-plant-derived polyol (B) is a polyol having a hydroxyl value of 18 to 26 mg KOH/g, and/or a polymer-dispersed polyol in which fine particles of a polymer of a compound having an unsaturated bond are dispersed in the polyol, and the content of a plant-derived component contained in the plant-derived polyol (A) is 14 to 19 wt % based on 100 wt % of the materials.

[5] A process for manufacturing vehicle seats, comprising a step of covering the molded urethane foam pad with a seat upholstery.

The molded urethane foam pads for vehicle seats according to the present invention comprise a polyurethane and have a core density of 55 to 65 kg/m$^3$, (1) an impact resilience of 63 to 69%, (2) a wet hot compression set (50% wet set) of not more than 15% and (3) a residual strain by repeated compression of not more than 4% as measured in accordance with JIS K6400, and the polyurethane contains a plant-derived molecular structure and the content of the plant-derived molecular structure is 15 to 20 wt % based on 100 wt % of the molded urethane foam pad.

Advantageous Effects of Invention

The molded urethane foam pads for vehicle seats according to the invention have a high contribution to the recent social tendency for global environmental protection and reduced environmental load, and have excellent impact resilience, hardness and durability with good balance in contrast to the conventional plant-derived products. The vehicle seats of the invention have the molded urethane foam pads and thereby provide high comfort.

DESCRIPTION OF EMBODIMENTS

[Molded Urethane Foam Pads for Vehicle Seats]

Molded urethane foam pads for vehicle seats according to the invention are obtainable by foaming and curing materials including a plant-derived polyol (A), a non-plant-derived polyol (B), water, a catalyst, a foam stabilizer and a polyisocyanate, and have a core density of 55 to 65 kg/m$^3$ as measured in accordance with JIS K6400.

If the core density is excessively low, the vehicle seat will be sunk so deeply when the driver or passenger gets seated that he will feel that he has hit the bottom. If the core density is excessively high, the urethane pads are heavy. In the invention, thus, the core density is preferably within the above range.

In the molded urethane foam pads for vehicle seats comprising a polyurethane according to the invention, the polyurethane contains a plant-derived molecular structure and the content of the plant-derived molecular structure is 15 to 20 wt % based on 100 wt % of the molded urethane foam pad. If the content of the plant-derived molecular structure is less than 15 wt %, the contribution to global environmental protection and reduced environmental load is reduced. If it exceeds 20 wt %, the pads will lower the impact resilience and have deteriorated cushioning properties or touch, failing to meet market demands for vehicle seat comfort.

The plant-derived molecular structure contained in the polyurethane is derived from the plant-derived polyol (A) described later and is formed from a hydroxycarboxylic acid having 15 or more carbon atoms obtained from plant-derived material and a plant-derived polyhydric alcohol. Accordingly, the content of the plant-derived molecular structure in the molded urethane foam pad may be calculated from the content of these plant-derived components found in the plant-derived polyol (A). Provided that the proportion of the plant-derived components in the plant-derived polyol (A) is referred to as the plant content proportion in the plant-derived polyol (A), for example, a plant-derived polyol (A) that is formed from a plant-derived, C15 or higher hydroxycarboxylic acid and a plant-derived polyhydric alcohol has a plant content proportion of 100%. Accordingly, the plant-derived components in this case are the plant-derived, C15 or higher hydroxycarboxylic acid and the plant-derived polyhydric alcohol.

Examples of the hydroxycarboxylic acids include castor oil fatty acids resulting from the hydrolysis of castor oils, and hydroxylated soybean oil fatty acids that are derivatives of soybean oil fatty acids resulting from the hydrolysis of soybean oils. Specific examples of the castor oil fatty acids are those obtained by the hydrolysis of castor oils containing ricinoleic acid and/or 12-hydroxystearic acid as a main component. Such fatty acids may be favorably used in the invention.

Examples of the plant-derived polyhydric alcohols include trihydric alcohols such as glycerol and hexahydric alcohols such as sorbitol.

These components will be described in more detail later.

Whether polymers, including the molded urethane foam pads of the invention, have involved biomass materials may be determined by measuring the amount of $^{14}C$ and that of $^{12}C$ and $^{13}C$ and determining the proportion of $^{14}C$ (the $^{14}C$ concentration) in accordance with ASTM D6866.

In more detail, a sample may be burnt to emit $CO_2$ and the $CO_2$ gas may be accurately determined and fed to an AMS (accelerated mass spectrometry) apparatus to measure the content of $^{14}C$ and that of $^{12}C$ and $^{13}C$, and the $^{14}C$ concentration may be compared with that in the atmosphere or petrochemicals, as described in ASTM (American Society for Testing and Materials) D6866 (Standard Test Method for Determining the Biobased Content of Natural Range Materials Using Radiocarbon and Isotope Ratio Mass Spectrometry Analysis).

Alternatively, a sample may be burnt and the released $CO_2$ may be absorbed with a $CO_2$ absorbent or converted to benzene, and the $^{14}C$ content may be measured with a liquid scintillation counter and compared with that of petroleum materials.

$^{14}C$ is not observed in polyols that have been synthesized from petroleum-derived materials alone, whilst it is found in polyols obtained using plant-derived materials. To achieve less carbon dioxide emissions, the polyurethane foams suitably have a $^{14}C$ concentration of 10 pMC (percent modern carbon) or more, preferably 15 pMC or more, and more preferably 20 pMC or more.

The molded urethane foam pads for vehicle seats according to the invention have the following properties in accordance with JIS K6400.

(1) The molded urethane foam pads for vehicle seats have an impact resilience of 63 to 69%.

Impact resilience less than 63% is not favorable in terms of cushioning properties and touch, and the obtainable vehicle seats do not provide excellent comfort. Impact resilience exceeding 69% is not desirable from the safety aspect because the stability during running is deteriorated. With the impact resilience in the above range, the molded urethane foam pads significantly contribute to high comfort of vehicle seats and human safety.

(2) The molded urethane foam pads for vehicle seats have a wet hot compression set (50% wet set) of not more than 15%, preferably not more than 12%, and more preferably not more than 10%.

The wet hot compression set (50% wet set) may be determined in accordance with JIS K6400. In detail, a 50 mm×50 mm×25 mm portion as a test piece is cut from the core of the molded urethane foam pad, and the test piece is sandwiched between plane parallel plates and compressed to 50% thickness. The test piece is allowed to stand at 50° C. and 95% RH for 22 hours, and is thereafter released from the compression and allowed to stand at normal temperature for 30 minutes. The thickness is measured and the compression set (%) relative to the thickness before the testing is obtained.

If the wet hot compression set (50% wet set) exceeds 15%, the urethane pads are likely to change thickness after a long period of use, and the vehicle seats will not have high durability.

(3) The molded urethane foam pads for vehicle seats have a residual strain by repeated compression of not more than 4%, preferably not more than 2%, and more preferably not more than 1%.

The residual strain (%) by repeated compression may be determined in accordance with JIS K6400. In detail, a 100 mm×100 mm×50 mm (thickness) portion as a test piece is cut from the core of the molded urethane foam pad, and the test piece is compressed to 50% thickness 80,000 times at a rate of 60 times per minute. The change in thickness before and after the compression test is obtained as the residual strain.

If the residual strain by repeated compression exceeds 4%, a change in thickness is likely to occur after a long period of use. The residual strain by repeated compression is responsible for the durability of the vehicle seats.

The molded urethane foam pads for vehicle seats of the invention are obtained from the specific materials described later and have a core density of 55 to 65 kg/m³, and the polyurethane contains the specific amount of the plant-derived molecular structure. Such molded urethane foam pads have the properties (1) to (3) at the same time. In particular, the pads satisfying all the properties (1) to (3) are comparable or superior to petroleum polyurethane vehicle seat pads in impact resilience, hardness and durability, and the balance of these properties is excellent. Accordingly, the urethane pads of the invention can give vehicle seats having high comfort and durability.

In the invention, the molded urethane foam pads for vehicle seats having the above properties are obtained by foaming and curing materials including a plant-derived polyol (A), a non-plant-derived polyol (B), water, a catalyst, a foam stabilizer, a polyisocyanate and optionally other auxiliaries.

The plant-derived polyol (A) is preferably a polyol which is obtained by condensing a polyhydric alcohol of 6 hydroxyl groups with a hydroxycarboxylic acid having 15 or more carbon atoms obtained from plant-derived material and which has a hydroxyl value of 45 to 55 mg KOH/g. The non-plant-derived polyol (B) is a polyol other than the plant-derived polyols (A), and is preferably a polyol having a hydroxyl value of 18 to 26 mg KOH/g, a polymer-dispersed polyol in which fine particles of a polymer of a compound having an unsaturated bond are dispersed in the polyol, or a mixture of a polyol having a hydroxyl value of 18 to 26 mg KOH/g and a polymer-dispersed polyol in which fine particles of a polymer of a compound having an unsaturated bond are dispersed in the polyol.

The materials will be described in detail below.

⟨Polyols⟩

(A) Plant-Derived Polyols

The plant-derived polyols (A) used in the invention are polyols produced using plant-derived materials. Examples include castor oil derivatives, soybean oil derivatives, and polyols resulting from the condensation of these derivatives with polyhydric alcohols. The plant-derived polyols may be used singly, or two or more kinds may be used in combination.

Specific examples of the castor oil derivatives include polyester polyols that comprise condensates of castor oil fatty acids resulting from the hydrolysis of castor oils, polyester polyols that comprise condensates of hydrogenated castor oil fatty acids, and mixtures of these polyester polyols.

Specific examples of the soybean oil derivatives include hydroxylated soybean oils, and polyester polyols that comprise hydroxylated soybean oil fatty acid condensates.

A preferred plant-derived polyol (A) is a plant-derived polyol that is obtained by condensing a polyhydric alcohol of 6 hydroxyl groups with a C15 or higher hydroxycarboxylic acid and has a hydroxyl value of 45 mg KOH/g to 55 mg KOH/g. The condensation may be performed by known methods, for example in the presence of a titanium catalyst.

The molded urethane foam pads according to the invention involve the plant-derived polyester polyol which is obtained by condensing a polyhydric alcohol of 6 hydroxyl groups with a C15 or higher hydroxycarboxylic acid and which has a hydroxyl value of 45 mg KOH/g to 55 mg KOH/g. As a result, the molded urethane foam pads can give vehicle seats that have excellent impact resilience and durability as cushioning materials, appropriate hardness and elasticity for comfortable sit (static comfort), and good vibration absorbing properties to reduce vibrations from the road and to achieve comfortable ride (dynamic comfort). The use of the above polyol according to the invention makes it possible that the obtainable urethane foam pads have impact resilience and comfort that are comparable to those of petroleum polyurethane vehicle seat pads, in contrast to the existing polyurethane pads containing plant-derived components. Here, the words "polyhydric alcohols of 6 hydroxyl groups" comprehend mixtures of two or more polyhydric alcohols which have 6 functional groups on average, and alkylene oxide adducts of polyhydric alcohols (described later) in which ethylene oxide, propylene oxide or the like is added to a polyhydric alcohol of 6 hydroxyl groups.

A greater contribution can be made to global environmental protection and reduced environmental load when the polyhydric alcohol of 6 hydroxyl group is of plant origin.

In the invention, the content of the plant-derived component(s) in the plant-derived polyol (A) is 14 to 19 wt % based on 100 wt % of the materials. If the content is below 14 wt %, the contribution to global environmental protection and reduced environmental load is reduced. If it exceeds 19 wt %, the pads will lower the impact resilience and have deteriorated cushioning properties or touch, failing to meet market demands for vehicle seat comfort. The proportion of plant-derived components in the plant-derived polyol (A) (the plant content proportion in the plant-derived polyol (A)) is as described hereinabove. When the content is in the above range, the molded urethane foam pads for vehicle seats of the invention may contain plant-derived molecular structures in the polyurethane at 15 to 20 wt % based on 100 wt % of the molded urethane foam pad.

Examples of the polyhydric alcohols include C2-10 dihydric alcohols such as ethylene glycol, propylene glycol, diethylene glycol, dipropylene glycol, 1,3-propanediol, 1,3-butanediol, 1,4-butanediol, 1,6-hexanediol and 1,4-cyclohexanediol; C2-10 trihydric alcohols such as trimethylolpropane and glycerol; tetrahydric alcohols such as diglycerol and pentaerythritol; hexahydric alcohols such as dipentaerythritol and sorbitol; sugars and derivatives thereof such as glucose, sorbitol, dextrose, fructose and sucrose; and phenols having two or more hydroxyl groups such as bisphenol A. Examples of the plant-derived polyhydric alcohols include trihydric alcohols such as glycerol, and hexahydric alcohols such as sorbitol.

The above polyhydric alcohols may be addition reacted with ethylene oxide, propylene oxide or the like. Namely, such alkylene oxide adducts of the polyhydric alcohols are also usable.

The polyhydric alcohols may be used singly, or two or more kinds may be used in combination.

The C15 or higher hydroxycarboxylic acids may be preferably plant-derived, saturated or unsaturated hydroxy fatty acids or hydrogenated products of the unsaturated hydroxy fatty acids, with C15-20 fatty acids being particularly preferable. In particular, saturated or unsaturated hydroxy fatty acids isolated from natural fats and oils such as castor oil, *Dimorphotheca* oil, *Lesquerella* oil and *Lesquerella densipila* seed oil, and hydrogenated products of the unsaturated hydroxy fatty acids are preferable, and fatty acids containing ricinoleic acid and/or 12-hydroxystearic acid as a main component are particularly preferable. Non-hydroxy unsaturated fatty acids obtained from soybean oil, olive oil, rice bran oil, palm oil or the like may be hydroxylated, with examples of such fatty acids including oleic acid and linoleic acid. Further, hydroxylated soybean oil fatty acids may be isolated from hydroxylated products of soybean oil. Such hydroxylated plant oil fatty acids may be suitably used in the invention.

The plant-derived polyols (A) preferably have an acid value of not more than 10 mg KOH/g, more preferably not more than 5 mg KOH/g, and particularly preferably not more than 3 mg KOH/g.

(B) Non-Plant-Derived Polyols

The non-plant-derived polyols (B) in the invention may be any polyols that are generally used in the production of conventional flexible polyurethane foams. The non-plant-derived polyols (B) may be used singly, or two or more kinds may be used in combination.

As described below, the non-plant-derived polyol (B) is preferably a polyol having a hydroxyl value of 18 to 26 mg KOH/g, a polymer-dispersed polyol in which fine particles of a polymer of a compound having an unsaturated bond are dispersed in the polyol, or a mixture of a polyol having a hydroxyl value of 18 to 26 mg KOH/g and a polymer-dispersed polyol in which fine particles of a polymer of a compound having an unsaturated bond are dispersed in the polyol.

The non-plant-derived polyol (B), in combination with the plant-derived polyol (A), can give polyurethane pads having appropriate impact resilience and excellent durability. Accordingly, the vehicle seats obtained according to the invention provide appropriate comfort and durability.

The use of the polyols (B) having the above hydroxyl value leads to vehicle seats having appropriate impact resilience and excellent durability. If the hydroxyl value is below 18 mg KOH/g, the viscosity of the polyol is excessively high at an undesirable level. If it exceeds 26 mg KOH/g, the impact resilience will be lowered.

In the invention, the amount of the non-plant-derived polyol (B) is 150 to 400 wt %, and preferably 200 to 350 wt % based on 100 wt % of the plant-derived polyol (A). If the polyol (B) is used at less than 150 wt %, the obtainable polyurethane pads drastically lower the impact resilience. The use thereof in excess of 400 wt % is not favorable in view of environmental load reduction.

For example, the non-plant-derived polyols (B) may be obtained as follows.

The starting compound for the non-plant-derived polyol (B) may be an active hydrogen compound that has an active hydrogen atom on an oxygen atom or a nitrogen atom. Active hydrogen compounds having 2 to 8 functional groups are preferred.

Examples of the active hydrogen compounds having an active hydrogen atom on an oxygen atom include water, C1-20 carboxylic acids, C2-20 polyvalent carboxylic acids having 2 to 6 carboxyl groups in the molecule, carbamic acids, C1-20 alcohols, C2-20 polyhydric alcohols having 2 to 8 hydroxyl groups in the molecule, sugars and derivatives thereof, C6-20 aromatic compounds having 1 to 3 hydroxyl groups in the molecule, and polyalkylene oxides having 2 to 8 terminals in the molecule wherein at least one terminal has a hydroxyl group.

Examples of the active hydrogen compounds having an active hydrogen atom on a nitrogen atom include C1-20 aliphatic or aromatic primary amines, C2-20 aliphatic or aromatic secondary amines, C2-20 polyvalent amines having 2 to 3 primary or secondary amino groups in the molecule, C4-20 saturated cyclic secondary amines, C4-20 unsaturated cyclic secondary amines, C4-20 cyclic polyvalent amines having 2 to 3 secondary amino groups in the molecule, C2-20 unsubstituted or N-monosubstituted acid amides, 5 to 7-membered cyclic amides, and imides of C4-10 dicarboxylic acids.

These active hydrogen compounds may be used singly, or two or more kinds may be used in combination. Of the active hydrogen compounds, C2-20 polyhydric alcohols having 2 to 8 hydroxyl groups in the molecule are preferable, and ethylene glycol, propylene glycol, diethylene glycol, dipropylene glycol, glycerol, diglycerol, pentaerythritol and sorbitol are more preferable.

Preferred alkylene oxides which may be added to the starting compounds are C2-12 alkylene oxides. Specific examples include ethylene oxide, propylene oxide, 1,2-butylene oxide, 2,3-butylene oxide, styrene oxide, cyclohexene oxide, epichlorohydrin, epibromohydrin, methyl glycidyl ether, allyl glycidyl ether and phenyl glycidyl ether. Ethylene oxide, propylene oxide, 1,2-butylene oxide and styrene oxide are more preferable, and ethylene oxide and propylene oxide are particularly preferable.

These alkylene oxides may be used singly, or two or more kinds may be used in combination.

Of the polyether polyols produced as described above, polyether polyols that are obtained by addition polymerization of alkylene oxides including ethylene oxide (hereinafter, also the polyoxyalkylene polyols) are preferred. The hydroxyl value of the polyether polyols is preferably 18 to 26 mg KOH/g, and more preferably 18 to 24 mg KOH/g. The content of the structural units derived from ethylene oxide (the total oxyethylene group content) is preferably 5 to 30% by mass, and more preferably 7 to 20% by mass based on 100% by mass of the total of all the structural units derived from the alkylene oxides in the polyether polyol (B). The total degree of unsaturation in the polyols is not particularly limited, but is preferably not more than 0.08 meq/g, more preferably not more than 0.06 meq/g, and most preferably not more than 0.04 meq/g. Here, the total degree of unsaturation is measured in accordance with JIS K1557. Examples of such polyether polyols include ACTCOL EP-901P manufactured by Mitsui Chemicals Polyurethanes, Inc.

The above-described polyether polyols may be used directly as the non-plant-derived polyols (B). Alternatively, polymer-dispersed polyols may be used in which fine particles of a polymer resulting from the radical polymerization of a compound having an unsaturated bond in the above polyether polyols are dispersed in the polyols. (Such polymer-dispersed polyols will be also referred to as the polymer polyols.) The polyether polyols and the polymer polyols may be used in combination.

By the use of the polymer polyols, the hardness of the obtainable molded urethane foam pads may be controlled within a certain range.

The polymer polyol may be obtained by the dispersion polymerization of a compound having an unsaturated bond, in the above-described polyol using a radical initiator such as azobisisobutyronitrile, resulting in a dispersion in which vinyl polymer particles are dispersed in the polyol. The vinyl polymer particles may be vinyl polymer particles that are composed of a polymer of the compound having an unsaturated bond, and are preferably polymer particles in which at least part of the compound having an unsaturated bond has been grafted to the dispersion medium polyol during the dispersion polymerization.

The unsaturated compounds herein have an unsaturated bond in the molecule, with examples including acrylonitrile, styrene and acrylamide. The compounds having an unsaturated bond may be used singly, or two or more kinds may be used in combination.

Examples of the polymer polyols include ACTCOL POP-3690P manufactured by Mitsui Chemicals Polyurethanes, Inc.

⟨Water⟩

Water used in the invention reacts with the polyisocyanate to cause the release of carbon dioxide gas, which then expands the polyurethane resin. The usage amount of water is preferably 1.0 to 6.0 parts by mass, more preferably 1.5 to 4.0 parts by mass, and particularly preferably 2.0 to 3.5 parts by mass based on 100 parts by mass of all the polyol components. This amount of water as a foaming agent ensures stable foaming.

⟨Catalysts⟩

The catalysts used in the invention catalyze the reaction of the polyols and the polyisocyanates. Known catalysts may be used without limitation. Preferred examples include aliphatic amines such as triethylenediamine, bis-(2-dimethylaminoethyl)ether, 1-isobutyl-2-methylimidazole and morpholine, and organotin compounds such as tin octanoate and dibutyltin dilaurate. Amine catalyst Minico L1020 manufactured by Katsuzai Chemical Corporation and amine catalyst Minico TMDA manufactured by Katsuzai Chemical Corporation may be used as the catalysts.

The catalysts may be used singly, or two or more kinds may be used in combination. The total usage amount of the catalysts is preferably 0.1 to 10 parts by mass based on 100 parts by mass of all the polyol components.

⟨Foam Stabilizers⟩

The foam stabilizers used in the invention may be known foam stabilizers without limitation. Organosilicon surfactants may be preferably used. Preferred examples include Y-10366 and L-5309 manufactured by Momentive Performance Materials Inc., and SRX-274C, SF-2969, SF-2961, SF-2962, L-3601, L-3600, L-5366, SZ-1325 and SZ-1328 manufactured by Dow Corning Toray Silicone Co., Ltd. The usage amount of the foam stabilizers is preferably 0.1 to 10 parts by mass, and more preferably 0.5 to 5 parts by mass based on 100 parts by mass of all the polyol components.

⟨Polyisocyanates⟩

The polyisocyanates used in the invention are not particularly limited and may be known polyisocyanates such as those described in Polyurethane Jushi Handbook (Polyurethane Resin Handbook), edited by Keiji IWATA, first printing, THE NIKKAN KOGYO SHIMBUN, LTD. (1987), pp. 71-98. Preferred examples include toluoylene diisocyanates (wherein the isomeric ratio of isomers such as 2,4-isomer and 2,6-isomer is not particularly limited, but the 2,4-isomer/2,6-isomer ratio is preferably 80/20, with specific examples including COSMONATE T80 manufactured by Mitsui Chemicals Polyurethanes, Inc.), polymethylene polyphenyl polyisocyanates (such as COSMONATE M-200 manufactured by Mitsui Chemicals Polyurethanes, Inc.), urethane-modified products thereof, and mixtures thereof (such as COSMONATE TM-20 manufactured by Mitsui Chemicals Polyurethanes, Inc.).

In the case where the polyisocyanate is a mixture of toluoylene diisocyanate and another polyisocyanate, it is preferable from the viewpoints of durability, impact resilience and mechanical strength of the obtainable urethane pads that the toluoylene diisocyanate accounts for 50 to 99% by mass, more preferably 70 to 90% by mass, and particularly preferably 75 to 85% by mass of the total of the polyisocyanates.

In the invention, the components are desirably used such that the NCO index is preferably 0.70 to 1.30, and more preferably 0.80 to 1.20. The NCO index herein refers to the value obtained by dividing the total number of the isocyanate groups in the polyisocyanate (s) with the total number of active hydrogens that react with the isocyanate groups, such as the hydroxyl groups in the polyols, the amino groups in crosslinking agents and the like, and active hydrogen in water. That is, when the active hydrogens that react with the isocyanate groups are stoichiometrically equivalent to the isocyanate groups in the polyisocyanate (s), the NCO index is 1.00.

⟨Other Auxiliaries⟩

In the invention, additives commonly used in the production of polyurethane foams may be used in addition to the aforementioned components as long as still achieving the objects of the invention. Exemplary additives are chain extenders, crosslinking agents, cell openers and other auxiliaries such as flame retardants, pigments, ultraviolet absorbers and antioxidants.

[Vehicle Seats]

Vehicle seats according to the invention include the molded urethane foam pad for vehicle seats and a seat upholstery. The production of the vehicle seats includes a step of covering the molded urethane foam pads for vehicle seats with a seat upholstery.

The vehicle seats of the invention have the specific molded urethane foam pads and thereby achieve appropriate hardness and elasticity to provide comfortable sitting (static comfort) and excellent vibration absorbing properties to reduce vibrations from the road and to achieve comfortable ride (dynamic comfort). Accordingly, the vehicle seats are very comfortable and can reduce the fatigue in long drive, thereby significantly contributing to the human safety.

[Processes for Producing Molded Urethane Foam Pads]

The molded urethane foam pads for vehicle seats may be produced by any processes without limitation, and known production processes may be adopted appropriately. A cold cure mold foaming process is preferable for the production of seat pads for such vehicles as automobiles.

A known cold cure mold foaming process may be used for the production of the molded urethane foam pads. In an exemplary cold cure mold foaming process, the plant-derived polyol (A), the non-plant-derived polyol (B), water, the catalyst, the foam stabilizer and optionally other auxiliaries are mixed together in advance to give a resin premix, the resin premix is then mixed with the polyisocyanate usually with a high-pressure foaming machine or a low-pressure foaming machine so that the target NCO index can be obtained, and the mixture is injected to a mold and is reacted, foamed and cured to form a molded urethane foam pad having a given shape.

In the use of the plant-derived polyol (A), a multicomponent high-pressure foaming machine is preferably used. For example, the non-plant-derived polyol (B), water, the catalyst, the foam stabilizer and optionally other auxiliaries may be mixed together to give a resin premix, the resin premix may be then mixed with the plant-derived polyol (A) and the polyisocyanate in a multicomponent mixing head of a multicomponent high-pressure foaming machine so that the target NCO index can be obtained, and the mixture may be injected to a mold and reacted, foamed and cured to form a molded urethane foam pad having a given shape. The plant-derived polyols (A) used in the invention generally have high hydrophobicity and can be separated when mixed in a resin premix containing water. The separation of the resin premix results in a failure of stable production of the objective urethane foams. But the use of a multicomponent head avoids the risk of such separation, and stable production of the urethane foams is possible. Further, the use thereof also simplifies the steps for the premix production, and the molded urethane foam pads of the invention may be manufactured more efficiently. For these reasons, the use of a multicomponent mixing head of a multicomponent high-pressure foaming machine is very advantageous in the production of the urethane pads using the plant-derived polyols (A).

The curing time is usually 30 seconds to 30 minutes. The mold temperature is usually from room temperature to approximately 80° C. The curing temperature is preferably from room temperature to approximately 150° C. After curing, the cured products may be heated at a temperature in the range of 80 to 180° C. while still achieving the objects and advantageous effects of the invention.

The resin premix is typically mixed with the polyisocyanate with use of a high-pressure foaming machine or a low-pressure foaming machine. When the catalyst used is a hydrolyzable compound such as an organotin catalyst, the contact with water is preferably avoided by injecting the water-containing component(s) and the organotin catalyst component through respective routes to the foaming machine and mixing them in the mixing head of the foaming machine.

When a multicomponent head is used, the components may be mixed together in the mixing head of a foaming machine without preparing a resin premix.

EXAMPLES

The present invention will be described in detail by presenting examples hereinbelow without limiting the scope of the invention. The analyses and measurements in Examples and Comparative Examples were performed in accordance with the following methods.

(1) Core Density (In the Table in Examples, the Core Density is Abbreviated to "Dco".)

The core density was measured in accordance with the measurement method for apparent density described in JIS K-6400 (1997). In the invention, the skin of the foam sample was removed to prepare a cuboid sample, and the core density was measured.

(2) Hardness (In the Table in Examples, the Hardness is Abbreviated to "25% ILD".)

The hardness was measured in accordance with the method A described in JIS K-6400 (1997).

(3) Impact Resilience (In the Table in Examples, the Impact Resilience is Expressed as Ball Rebound, Abbreviated to "BR".)

The ball rebound was measured in accordance with the method described in JIS K-6400 (1997).

(4) Wet Hot Compression Set (In the Table in Examples, "50% Dry Set" and "50% Wet Set".)

The measurement was performed by the method described in JIS K-6400 (1997). A 50 mm×50 mm×25 mm portion as a test piece was cut from the core of the foam sample, and the test piece was sandwiched between plane parallel plates and compressed to 50% thickness. The test piece was allowed to stand under the specific conditions for 22 hours, and was thereafter released from the compression and allowed to stand at normal temperature for 30 minutes. The thickness was measured and the compression set (%) relative to the thickness before the testing was obtained. Here, the 50% dry set indicates the compression set caused by the standing at 70° C. for 22 hours, and the 50% wet set is the compression set due to the standing at 50° C. and 95% RH for 22 hours.

(5) Tensile Strength, Elongation and Tear Strength

These properties were measured by the method described in JIS K-6400 (1997).

(6) Residual Strain by 80,000 Times Repeated Compressions

The testing was performed in accordance with JIS K-6400 (1997). A 100 mm×100 mm×50 mm (thickness) portion as a test piece was cut from the core of the molded urethane foam, and the test piece was compressed to 50% thickness 80,000 times at a rate of 60 times per minute.

After the compressions, the test piece was allowed to stand at normal temperature for 30 minutes and the thickness thereof was measured. The change (%) in thickness before and after the testing was calculated.

(7) Hysteresis Loss Rate

The measurement was performed by the method described in JIS K-6400 (1997).

(8) Acid Value

The measurement was performed by the method described in JIS K-1557.

(9) Hydroxyl Value

The measurement was performed by the method described in JIS K-1557.

(10) Content (wt %) of Plant-Derived Molecular Structures in Molded Urethane Foams The content (wt %) of plant-derived molecular structures in the molded urethane foams was determined as follows.

[1] The letter α was defined to indicate the total amount of the resin premix and the isocyanate that was stoichiometrically necessary for the resin premix.

[2] Since water in the resin premix would react with the isocyanate and would be released as carbon dioxide, the amount of carbon dioxide expected from the parts of water was subtracted from α. The difference was defined to be β.

[3] The letter γ was defined to be the content of plant-derived components in the plant-derived polyol contained in the resin premix. The content γ was divided by β to give the content (wt %) of plant-derived molecular structures in the molded urethane foam.

(11) Sensory Evaluation of Vehicle Seats

The vehicle seats were evaluated by five Japanese male panelists of equal level having a sensory evaluation experience of at least 10 years.

A urethane pad adjusted to a hardness (25% ILD) of 260 N/314 cm$^2$ was assembled to a vehicle seat, and the seat was installed to a sedan car. The panelists drove on a test course and evaluated the fatigue or discomfort. The fatigue or discomfort level with a conventional petroleum-derived urethane pad was decided to be 3.0. When the panelist felt less fatigue or discomfort and evaluated the seat more comfortable, the seat was given a point of more than 3.0. The conventional petroleum-derived urethane pad had the following properties.

Core density: 58.4 kg/m$^3$, impact resilience: 65%, WS: 12.7%, residual strain: 1.2%, plant content proportion: 0 wt %.

⟨Plant-Derived Polyols (A)⟩

(A-1)

A hydroxyl group-containing, C15 or higher hydroxycarboxylic acid, in detail a castor oil fatty acid based on ricinoleic acid from castor oil (hydroxyl value 163 mg KOH/g, acid value 187 mg KOH/g, molecular weight 298) was fed to glycerol (molecular weight 92) in a molar ratio of 10.5 relative to 1 mol of the glycerol. Further, titanium lactate [(HO)$_2$Ti(C$_3$H$_5$O$_3$)$_2$] as a catalyst was added in an amount of 100 ppm based on the total of these compounds. A condensation reaction was performed at temperatures of 200 to 230° C. for 30 hours. Water that resulted from the condensation reaction was continuously removed from the system during the reaction.

The condensation gave a plant-derived polyol (A-1) having a hydroxyl value of 30 mg KOH/g and an acid value of 2.3 mg KOH/g.

Since the glycerol was of plant origin, the plant content proportion of the plant-derived polyol (A-1) was 100%.

(A-2)

A hydroxyl group-containing, C15 or higher hydroxycarboxylic acid, in detail a castor oil fatty acid based on ricinoleic acid from castor oil (hydroxyl value 163 mg KOH/g, acid value 187 mg KOH/g, molecular weight 298) was fed to glycerol (molecular weight 92) in a molar ratio of 8.0 relative to 1 mol of the glycerol. A condensation reaction was performed in the same manner as in Synthetic Example (A-1).

The condensation gave a plant-derived polyol (A-2) having a hydroxyl value of 48 mg KOH/g and an acid value of 1.7 mg KOH/g.

Since the glycerol was of plant origin, the plant content proportion of the plant-derived polyol (A-2) was 100%.

(A-3)

A hydroxyl group-containing, C15 or higher hydroxycarboxylic acid, in detail a castor oil fatty acid based on ricinoleic acid from castor oil (hydroxyl value 163 mg KOH/g, acid value 187 mg KOH/g, molecular weight 298) was fed to glycerol (molecular weight 92) in a molar ratio of 5.6 relative to 1 mol of the glycerol. A condensation reaction was performed in the same manner as in Synthetic Example (A-1).

The condensation gave a plant-derived polyol (A-3) having a hydroxyl value of 77 mg KOH/g and an acid value of 1.5 mg KOH/g.

Since the glycerol was of plant origin, the plant content proportion of the plant-derived polyol (A-3) was 100%.

(A-4)

A hydroxyl group-containing, C15 or higher hydroxycarboxylic acid, in detail a castor oil fatty acid based on ricinoleic acid from castor oil (hydroxyl value 163 mg KOH/g, acid value 187 mg KOH/g, molecular weight 298) was fed to a compound (molecular weight 842) having a hydroxyl value of 400 mg KOH/g that had been obtained by polymerizing 1 mol of sorbitol and 11.5 mol of propylene oxide. The molar ratio was 16.0 for the fatty acid relative to 1 mol of the compound. A condensation reaction was performed in the same manner as in Synthetic Example (A-1).

The condensation gave a plant-derived polyol (A-4) having a hydroxyl value of 48 mg KOH/g and an acid value of 1.5 mg KOH/g.

The weight of water resulting from the condensation reaction was subtracted from the weight of the compounds used, and the plant content proportion of the plant-derived polyol (A-4) was obtained. Since the propylene oxide in the compound obtained by polymerizing 1 mol of sorbitol and 11.5 mol of propylene oxide was not of plant origin, the plant content proportion of the plant-derived polyol (A-4) was 88%.

(A-5)

A hydroxyl group-containing, C15 or higher hydroxycarboxylic acid, in detail a castor oil fatty acid based on ricinoleic acid from castor oil (hydroxyl value 163 mg KOH/g, acid value 187 mg KOH/g, molecular weight 298) was fed to a compound (molecular weight 842) having a hydroxyl value of 400 mg KOH/g that had been obtained by polymerizing 1 mol of sorbitol and 11.5 mol of propylene oxide. The molar ratio was 16.7 for the fatty acid relative to 1 mol of the compound. A condensation reaction was performed in the same manner as in Synthetic Example (A-1).

The condensation gave a plant-derived polyol (A-5) having a hydroxyl value of 45 mg KOH/g and an acid value of 1.7 mg KOH/g.

The weight of water resulting from the condensation reaction was subtracted from the weight of the compounds used, and the plant content proportion of the plant-derived polyol (A-5) was obtained. Since the propylene oxide in the compound obtained by polymerizing 1 mol of sorbitol and 11.5 mol of propylene oxide was not of plant origin, the plant content proportion of the plant-derived polyol (A-5) was 88%.

(A-6)

A hydroxyl group-containing, C15 or higher hydroxycarboxylic acid, in detail a castor oil fatty acid based on ricinoleic acid from castor oil (hydroxyl value 163 mg KOH/g, acid value 187 mg KOH/g, molecular weight 298) was fed to a compound (molecular weight 842) having a hydroxyl value of 400 mg KOH/g that had been obtained by polymerizing 1 mol of sorbitol and 11.5 mol of propylene oxide. The molar ratio was 14.4 for the fatty acid relative to 1 mol of the compound. A condensation reaction was performed in the same manner as in Synthetic Example (A-1).

The condensation gave a plant-derived polyol (A-6) having a hydroxyl value of 55 mg KOH/g and an acid value of 1.7 mg KOH/g.

The weight of water resulting from the condensation reaction was subtracted from the weight of the compounds used, and the plant content proportion of the plant-derived polyol (A-6) was obtained. Since the propylene oxide in the compound obtained by polymerizing 1 mol of sorbitol and 11.5 mol of propylene oxide was not of plant origin, the plant content proportion of the plant-derived polyol (A-6) was 86%.

(A-7)

A plant-derived polyol (A-7) was a plant-derived polyol that had been obtained by refining castor oil squeezed from castor oil plant. The hydroxyl value was 160 mg KOH/g and the acid value was 0.3 mg KOH/g. The plant content proportion of the plant-derived polyol (A-7) was 100%.

⟨Non-Plant-Derived Polyols (B)⟩

(B-1)

A polyol (B-1) was polyoxyalkylene polyol ACTCOL EP-330N (manufactured by Mitsui Chemicals Polyurethanes, Inc.) having a hydroxyl value of 34 mg KOH/g.

(B-2)

A polyol (B-2) was polyoxyalkylene polyol ACTCOL EP-901P (manufactured by Mitsui Chemicals Polyurethanes, Inc.) having a hydroxyl value of 24 mg KOH/g.

(PB-1)

A polymer-dispersed polyol (PB-1) was ACTCOL POP-3128 (manufactured by Mitsui Chemicals Polyurethanes, Inc.) obtained by the graft polymerization of acrylonitrile in the polyoxyalkylene polyol (B-1) having a hydroxyl value of 34 mg KOH/g. The polymer-dispersed polyol had a hydroxyl value of 28 mg KOH/g and a vinyl polymer content of 20 wt %.

(PB-2)

A polymer-dispersed polyol (PB-2) was ACTCOL POP-3690P (manufactured by Mitsui Chemicals Polyurethanes, Inc.) obtained by the graft polymerization of acrylonitrile in the polyoxyalkylene polyol (B-2) having a hydroxyl value of 24 mg KOH/g. The polymer-dispersed polyol had a hydroxyl value of 20 mg KOH/g and a vinyl polymer content of 20 wt %.

Examples 1 to 4 and Comparative Examples 1 to 6

Molded urethane foam pads were manufactured by a cold cure mold foaming process using the plant-derived polyols (A), the non-plant-derived polyols (B), a polyisocyanate, a crosslinking agent, water, catalysts and a foam stabilizer. The polyisocyanate, the crosslinking agent, the foam stabilizer and the catalysts used herein are described below. The content of plant-derived components in the plant-derived polyols was obtained by multiplying the amount of the plant-derived polyols by the plant content proportion of the plant-derived polyols.

⟨Polyisocyanate⟩

COSMONATE TM-20 (manufactured by Mitsui Chemicals Polyurethanes, Inc.) was used which was a mixture of 80 parts of a 80:20 by mass mixture of 2,4-toluoylene diisocyanate and 2,6-toluoylene diisocyanate and 20 parts of polymethylene polyphenylene polyisocyanate.

⟨Crosslinking Agent⟩

ACTCOL KL-210 (manufactured by Mitsui Chemicals Polyurethanes, Inc., hydroxyl value: 850 mg KOH/g)) was used.

⟨Foam Stabilizer⟩

Y-10366 (manufactured by Momentive Performance Materials Inc.) was used.

⟨Catalyst 1⟩

Amine catalyst Minico L1020 (manufactured by Katsuzai Chemical Corporation) was used.

⟨Catalyst 2⟩

Amine catalyst Minico TMDA (manufactured by Katsuzai Chemical Corporation) was used.

[Formulations and Evaluation Results]

The components set forth in Table 1 were mixed together to give a resin premix. The resin premix was mixed with the polyisocyanate at an equivalent that would give the NCO index described in Table 1, in a high-pressure foaming machine (PEC-3B). The resultant mixture was injected to a mold of 400 mm×400 mm×100 mm (thickness) inside dimension that had been controlled at 65° C. and had a temperature controlling hot water piping. The mold was closed with a lid, and the mixture was cured for 6 minutes to give a molded urethane foam. The properties of the molded urethane foams obtained are shown in Table 1.

TABLE 1

|  | Examples | | | | Comparative Examples | | | | | |
| --- | --- | --- | --- | --- | --- | --- | --- | --- | --- | --- |
|  | 1 | 2 | 3 | 4 | 1 | 2 | 3 | 4 | 5 | 6 |
| Materials [parts by weight] | | | | | | | | | | |
| Polyol (B-1) |  |  |  |  |  |  |  |  |  | 26 |
| Polyol (PB-1) |  |  |  |  |  |  |  |  |  | 50 |
| Polyol (B-2) | 26 | 24 | 27 | 26 | 17 | 28 | 18 | 38 | 47 |  |
| Polyol (PB-2) | 50 | 45 | 50 | 50 | 35 | 50 | 60 | 40 | 30 |  |
| Crosslinking agent | 2 | 2 | 2 | 2 | 2 | 2 | 2 | 2 | 2 | 2 |
| Water | 2.5 | 2.5 | 2.5 | 2.5 | 2.5 | 2.5 | 2.5 | 2.5 | 2.5 | 2.5 |
| Plant-derived polyol (A-1) |  |  |  |  |  |  | 22 |  |  |  |
| Plant-derived polyol (A-2) |  |  |  |  |  | 22 |  |  |  |  |
| Plant-derived polyol (A-3) |  |  |  |  |  |  |  | 22 |  |  |
| Plant-derived polyol (A-4) | 24 | 31 |  |  | 48 |  |  |  |  | 24 |
| Plant-derived polyol (A-5) |  |  | 23 |  |  |  |  |  |  |  |
| Plant-derived polyol (A-6) |  |  |  | 24 |  |  |  |  |  |  |
| Plant-derived polyol (A-7) |  |  |  |  |  |  |  |  | 23 |  |

TABLE 1-continued

|  | Examples | | | | Comparative Examples | | | | | |
| --- | --- | --- | --- | --- | --- | --- | --- | --- | --- | --- |
|  | 1 | 2 | 3 | 4 | 1 | 2 | 3 | 4 | 5 | 6 |
| Catalyst 1 | 0.7 | 0.7 | 0.7 | 0.7 | 0.7 | 0.7 | 0.7 | 0.7 | 0.7 | 0.7 |
| Catalyst 2 | 0.14 | 0.14 | 0.14 | 0.14 | 0.14 | 0.14 | 0.14 | 0.14 | 0.14 | 0.14 |
| Foam stabilizer | 1.5 | 1.5 | 1.5 | 1.5 | 1.5 | 1.5 | 1.5 | 1.5 | 1.5 | 1.5 |
| Total amount in resin premix [parts by weight] | 106.84 | 106.84 | 106.84 | 106.84 | 106.84 | 106.84 | 106.84 | 106.84 | 106.84 | 106.84 |
| NCO index | 100 | 100 | 100 | 100 | 100 | 105 | 105 | 105 | 100 | 100 |
| Polyisocyanate [parts by weight] | 33.6 | 33.9 | 33.4 | 33.8 | 34.6 | 35.1 | 34.4 | 36.4 | 38.0 | 34.7 |
| Carbon dioxide by reaction with water [parts by weight] | 6.1 | 6.1 | 6.1 | 6.1 | 6.1 | 6.1 | 6.1 | 6.1 | 6.1 | 6.1 |
| Content of plant-derived components in plant-derived polyol [parts by weight] | 21 | 27 | 20 | 21 | 42 | 22 | 22 | 22 | 23 | 21 |
| Content of plant-derived components in materials [wt %] | 15 | 19 | 14 | 15 | 30 | 15 | 16 | 15 | 16 | 15 |
| Content of plant-derived molecular structures in molded urethane foam [wt %] | 16 | 20 | 15 | 15 | 31 | 16 | 16 | 16 | 17 | 16 |
| Dco [kg/m$^3$] | 58.1 | 56.1 | 56.1 | 56.1 | 57.9 | 56.9 | 57.3 | 56.0 | 58.7 | 57.8 |
| 25% ILD [N/314 cm$^2$] | 235 | 245 | 233 | 244 | 238 | 235 | 232 | 242 | 243 | 238 |
| BR [%] | 68 | 64 | 67 | 67 | 59 | 62 | 62 | 59 | 44 | 62 |
| Tensile strength [kPa] | 143 | 183 | 137 | 183 | 177 | 170 | 178 | 230 | 126 | 175 |
| Elongation [%] | 116 | 115 | 113 | 107 | 102 | 112 | 114 | 118 | 94 | 110 |
| Tear strength [N/cm] | 5.0 | 5.2 | 5.1 | 5.2 | 4.5 | 5.3 | 5.5 | 5.5 | 4.9 | 5.5 |
| 50% dry set [%] | 3.8 | 3.4 | 3.7 | 3.6 | 3.3 | 7.7 | 7.9 | 4.2 | 6.7 | 4.3 |
| 50% wet set [%] | 5.8 | 8.7 | 7.5 | 6.7 | 9.0 | 5.1 | 7.1 | 8.7 | 11.7 | 9.7 |
| Hysteresis loss rate [%] | 16.4 | 18.0 | 17.0 | 17.5 | 21.4 | 19.0 | 19.2 | 19.3 | 30.0 | 19.1 |
| Residual strain by 80,000 times repeated compressions [%] | 0.8 | 0.8 | 0.9 | 0.8 | 1.0 | 1.2 | 1.3 | 1.5 | 2.6 | 1.9 |

[Sensory Evaluation of Vehicle Seats]

The materials according to the formulations of Example 1 and Comparative Example 2 were molded in the same manner as described above using a seat mold to produce molded urethane foam pads. Vehicle seats having the urethane pads were sensory evaluated. The results are shown in Table 2.

TABLE 2

|  | Panelist A | Panelist B | Panelist C | Panelist D | Panelist E |
| --- | --- | --- | --- | --- | --- |
| Conventional seat (having a petroleum-derived urethane pad) | 3.0 | 3.0 | 3.0 | 3.0 | 3.0 |
| Seat obtained according to the formulation of Example 1 | 3.0 | 3.2 | 3.1 | 3.0 | 3.3 |
| Seat obtained according to the formulation of Comparative Example 2 | 2.6 | 2.7 | 2.7 | 2.5 | 2.8 |

As shown in Table 2, the vehicle seat which had the specific molded urethane foam pad of the invention proved excellent comfort in the sensory evaluation in comparison with the conventional vehicle seat having a petroleum urethane pad.

INDUSTRIAL APPLICABILITY

The vehicle seats having the molded urethane foam pads according to the invention make a great contribution to the recent social tendency for global environmental protection and reduced environmental load, and have high comfort as vehicle seats. The vehicle seats can thus reduce the fatigue in long drive of vehicles such as automobiles, and can significantly contribute to human safety.

The invention claimed is:

1. A process for manufacturing molded urethane foam pads for vehicle seats, wherein molded urethane foam pads having a core density of 55 to 65 kg/m$^3$ are produced from materials comprising a plant-derived polyol (A), a non-plant-derived polyol (B), water, a catalyst, a foam stabilizer and a polyisocyanate, and further wherein:

the process comprises a step of:

preparing a resin premix comprising the non-plant-derived polyol (B), water, the catalyst and the foam stabilizer, thereafter mixing the resin premix with the plant-derived polyol (A) and the polyisocyanate, injecting the mixture into a mold, reacting, foaming and curing the mixture, and releasing the product from the mold, the plant-derived polyol (A) is a polyol which is obtained by condensing a polyhydric alcohol of 6 hydroxyl groups with a plant-derived, C15 or higher hydroxycarboxylic acid and which has a hydroxyl value of 45 to 55 mg KOH/g, the non-plant-derived polyol (B) is a mixture of a polyol having a hydroxyl value of 18 to 26 mg KOH/g, and a polymer-dispersed polyol in which fine particles of a polymer of a compound having an unsaturated bond are dispersed in the polyol having a hydroxyl value of 18 to 26 mg KOH/g, and the content of a plant-derived component contained in the plant-derived polyol (A) is 14 to 19 wt % based on 100 wt % of the materials.

2. A process for manufacturing vehicle seats, comprising a step of covering the molded urethane foam pad for vehicle seats described in claim 1, with a seat upholstery.

\* \* \* \* \*